(12) United States Patent
Kang et al.

(10) Patent No.: US 9,215,713 B2
(45) Date of Patent: *Dec. 15, 2015

(54) ANTENNA ALLOCATION BASED ON FEEDBACK IN A DISTRIBUTED ANTENNA SYSTEM

(75) Inventors: Ji Won Kang, Anyang-si (KR); Jin Young Chun, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 561 days.

This patent is subject to a terminal disclaimer.

(21) Appl. No.: 13/639,439

(22) PCT Filed: Mar. 23, 2011

(86) PCT No.: PCT/KR2011/001993
§ 371 (c)(1),
(2), (4) Date: Oct. 4, 2012

(87) PCT Pub. No.: WO2011/126227
PCT Pub. Date: Oct. 13, 2011

(65) Prior Publication Data
US 2013/0029711 A1    Jan. 31, 2013

Related U.S. Application Data

(60) Provisional application No. 61/320,756, filed on Apr. 4, 2010, provisional application No. 61/324,305, filed on Apr. 15, 2010.

(30) Foreign Application Priority Data

Aug. 26, 2010  (KR) .................. 10-2010-0082738

(51) Int. Cl.
*H04W 72/06* (2009.01)
*H04B 7/02* (2006.01)
(Continued)

(52) U.S. Cl.
CPC ............. *H04W 72/046* (2013.01); *H04B 7/022* (2013.01); *H04B 7/0643* (2013.01); *H04B 7/0691* (2013.01); *H04W 88/085* (2013.01)

(58) Field of Classification Search
None
See application file for complete search history.

(56) References Cited

U.S. PATENT DOCUMENTS

2009/0247067 A1* 10/2009 Li et al. .................... 455/7
2011/0287790 A1* 11/2011 Haustein et al. .......... 455/500
2013/0235911 A1*  9/2013 Geirhofer et al. ......... 375/219

FOREIGN PATENT DOCUMENTS

| JP | 08-88599 | 4/1996 |
| JP | 2009-508370 | 2/2009 |
| JP | 2010-068496 | 3/2010 |

OTHER PUBLICATIONS

Japan Patent Office Application Serial No. 2013-502453, Notice of Allowance dated Mar. 28, 2014, 3 pages.

(Continued)

*Primary Examiner* — Philip Sobutka
(74) *Attorney, Agent, or Firm* — Lee, Hong, Degerman, Kang & Waimey

(57) ABSTRACT

A data transmission and receiving method of a terminal in a distributed antenna system. The method includes: receiving information on antenna nodes within a cell from a base station; receiving channel measurement signals determined by each antenna node from the base station; determining a preferred antenna node by measuring the channel measurement signals; transmitting feedback information on the determined antenna node to the base station; receiving antenna allocation information determined on the basis of the feedback information; and receiving data from the base station through an antenna indicated by the antenna allocation information. The antenna node includes at least one antenna.

16 Claims, 10 Drawing Sheets

(51) Int. Cl.
  *H04W 72/04* (2009.01)
  *H04B 7/06* (2006.01)
  *H04W 88/08* (2009.01)

(56) References Cited

OTHER PUBLICATIONS

X. Chen, et al., "Precoder design for distributed antenna systems based on channel angular domain information," 2009 International Conference on Communications, Circuits and Systems (ICCCAS 2009), pp. 133-137, Jul. 25, 2009.

R. Osawa, et al., "Performance of two-way channel estimation technique for multi-user distributed antenna systems with spatial precoding," 2009 IEEE 70th Vehicular Technology Conference Fall (VTC 2009—Fall), pp. 1-5, Sep. 23, 2009.

G. Jiansong, et al., "Reducing channel state information feedback for downlink distributed antenna system," 2009 IEEE 20th International Symposium on Personal, Indoor and Mobile Radio Communications, pp. 2767-2771, Sep. 16, 2009.

\* cited by examiner

ANTENNA ALLOCATION BASED ON FEEDBACK IN A DISTRIBUTED ANTENNA SYSTEM

CROSS-REFERENCE TO RELATED APPLICATIONS

This application is the National Stage filing under 35 U.S.C. 371 of International Application No. PCT/KR2011/001993, filed on Mar. 23, 2011, which claims the benefit of earlier filing date and right of priority to Korean Patent Application No. 10-2010-0082738, filed on Aug. 26, 2010, and also claims the benefit of U.S. Provisional Application Ser. No. 61/320,756, filed on Apr. 4, 2010, and U.S. Provisional Application Ser. No. 61/324,305, filed on Apr. 15, 2010, the contents of which are all hereby incorporated by reference herein in their entirety.

TECHNICAL FIELD

The present invention relates to wireless communications, and more particularly, to a data transmission method performed by a terminal in a distributed antenna system and a terminal using the method.

BACKGROUND ART

A distributed antenna system (DAS) means a system in which antennas are distributed and located at various locations and the antennas are managed by a single base station. In contrast, the conventional centralized antenna system (CAS) means a system in which the antennas of the base station are concentrated at the center of the cell.

The distributed antenna system may be distinguished from a femto cell/pico cell, a relay station, and an ad-hoc system. The distributed antenna system is different from the femto cell/pico cell forming a separate network by an individual antenna, in terms of the fact that all antenna areas are controlled by the central base station rather than that the area of the antenna itself is self-controlled by the individual antenna. The distributed antenna system may be distinguished from the relay station and the ad-hoc system in terms of the fact that each antenna can be connected by a wire. In addition, the distributed antenna system may be distinguished from a simple repeater in terms of the fact that each antenna transmits a different signal according to the command of the base station.

In early days, the distributed antenna system was provided to further install antennas within a cell in order to cover shaded areas and to transmit signals repeatedly. That is, the distributed antenna system was a main purpose of securing the coverage. However, when viewed macroscopically, the distributed antenna system may be considered as a kind of multiple input multiple output (MIMO) system in terms of the fact that the antennas can transmit or receive a plurality of data streams at the same time to support one or multiple users. The MIMO system has been recognized as a system that can satisfy the requirements of the next generation communications due to the high spectral efficiency. From the MIMO system viewpoint, the distributed antenna system has many advantages over the centralized antenna system. For example, there are advantages in that power efficiency can be high due to the reduction of the distance between the user and the antenna, the channel capacity can be high due to low correlation and interference between antennas, and communications with relatively uniform quality can be secured, regardless of the user's location within a cell.

In other words, the distributed antenna system having the above-mentioned advantages may be necessary to perform the MIMO transmission in order to secure high data capacity required in current and future communication standards. For example, it may be necessary to transmit rank 2 or more transmission to a single terminal (user equipment) (UE) in the same frequency domain (it is referred to as a single user MIMO (SU-MIMO)). In addition, the multi user (MU-MIMO) transmission that simultaneously supports several terminals may be required. This may be required in an uplink as well as a downlink.

The SU-MIMO and the MU-MIMO communications have been essentially considered in an IEEE 802 and a 3GPP LTE that are two standards organizations and actually covered in standards of an Institute of Electrical and Electronics Engineers (IEEE) 802.16e/m, 3GPP (3rd generation partnership project) LTE (long term evolution) Release 8/9, and the like. However, since the current communications standards were designed in consideration of the centralized antenna system (CAS), it is difficult to apply to the distributed antenna system (DAS) to which the advanced technology such as a MIMO technology is applied. Therefore, a communications standard that supports the distributed antenna system is required, and a data transmission method performed by a terminal that can be provided in the communication standard and the terminal that can be operated according to the method are required.

DISCLOSURE

Technical Problem

The present invention is to provide a data transmission method performed by a terminal in a distributed antenna system and a terminal using the method.

Technical Solution

According to an aspect of the present invention, a data transmission and receiving method of a terminal in a distributed antenna system, includes the steps of: receiving information on antenna nodes within a cell from a base station; receiving channel measurement signals determined by each antenna node from the base station; determining a preferred antenna node by measuring the channel measurement signals; transmitting feedback information on the determined antenna node to the base station; receiving antenna allocation information determined on the basis of the feedback information; and receiving data from the base station through an antenna indicated by the antenna allocation information, wherein said antenna node includes at least one antenna.

If the antenna node includes a plurality of antennas, the plurality of antennas may transmit the same channel measurement signals.

If the antenna node includes a plurality of antennas, some antennas of the plurality of antennas transmit the same channel measurement signals.

The information on the antenna nodes may include at least one of the number of total antenna nodes, the number of the antennas of each antenna node, and index mapping information. The index mapping information may be indicated whether any antenna is included in each antenna node. The information on the antenna node may be broadcasted by the base station.

The feedback information may include at least one of an index of a transmission antenna node requested by the terminal between all transmission antenna nodes performing a downlink transmission of the base station, a receiving strength of the antenna node selected by the terminal, the number of the transmission antenna node by requested by the terminal, the number of the transmission antenna node to satisfy a selection criterion, and an index of the transmission antenna node that satisfies the selection criterion.

The selection criterion may be determined according to whether the receiving strength of the downlink signal transmitted from the antenna node exceeds a threshold value.

The feedback information may further include a receiving strength of the downlink for each of every transmission antenna nodes.

The feedback information may include information on an antenna or antenna node that does not satisfy the selection criterion, the antenna or antenna node that does not satisfy the selection criterion may be represented that the receiving strength of the downlink signal transmitted from the transmission antenna node is equal to or less than the threshold value.

The antenna allocation information may include at least one of the indexes of antenna allocated to the terminal and the number of the antennas.

The antenna allocation information may further include information on the channel measurement signal that is applied to the individual antenna of the antenna node allocated to the terminal.

The antenna allocation information may include the index of antenna allocated to the terminal and the number of the antennas included in the antenna node allocated to the terminal.

The antenna allocation information may include at least one of the number of the antenna nodes, an antenna node index, a pattern index of the channel measurement signal of an antenna node unit, the number of antennas of each antenna node, an antenna index, a pattern index of the channel measurement signal of the antenna unit, mapping information between the antenna node index and the antenna index, and mapping information between the pattern index of the channel measurement signal of the antenna node unit and the pattern index of the channel measurement signal of the antenna unit.

The antenna allocation information may be unicasted to the terminal

According to another aspect of the present invention, a terminal includes: a RF unit transmitting and receiving radio signals; and a processer connected to the RF unit, wherein the processer receives information on antenna nodes within a cell from a base station, receives a channel measurement signals determined by each antenna node from the base station, measures the channel measurement signal to determine a preferred antenna node, and transmits feedback information for the determined antenna node to the base station, receives antenna allocation information determined on the basis of the feedback information, and receives data from the base station through an antenna indicated by the antenna allocation information, wherein the antenna node includes at least one antenna.

Advantageous Effects

According to the present invention, a base station and a terminal may perform data transmission and reception by allocating transmission and receiving antennas in an antenna node unit that can include a plurality of antennas, not an antenna unit. The present invention can applied in the distributed antenna system to increase the efficiency of the data transmission and reception.

MODE FOR INVENTION

A technology described below may be used in a variety of a multiple access schemes such as a code division multiple access (CDMA), a frequency division multiple access (FDMA), a time division multiple access (TDMA), an orthogonal frequency division multiple access (OFDMA), a single carrier-frequency division multiple access (SC-FDMA) and the like. The CDMA can be implemented by wireless technologies such as an UTRA (Universal Terrestrial Radio Access) or a CDMA 2000. The TDMA may be implemented by wireless technologies such as a Global System for Mobile communications (GSM)/a General Packet Radio Service (GPRS)/an Enhanced Data Rates for GSM Evolution (EDGE). The OFDMA may be implemented by wireless technologies such as an Institute of Electrical and Electronics Engineers (IEEE) 802.11 (Wi-Fi), an IEEE 802.16 (WiMAX), an IEEE 802.20, an E-UTRA (Evolved UTRA) and the like. The UTRA may be a portion of the Universal Mobile Telecommunications System (UMTS). The 3GPP (3rd Generation Partnership Project) LTE (Long Term Evolution) may adopt the OFDMA in a downlink and the SC-FDMA in an uplink as a portion of the E-UMTS (Evolved UMTS) using the E-UTRA. An LTE-A (Advanced) may be an evolution of the LTE.

Figure 1:
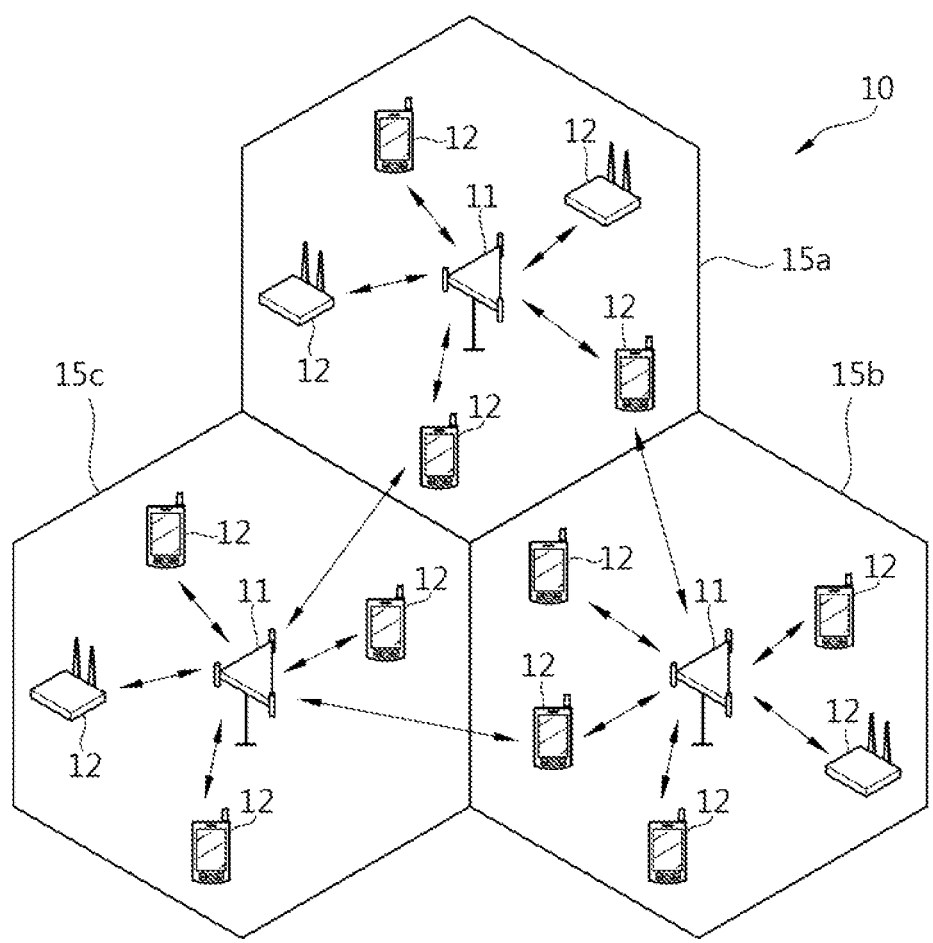
FIG. 1 is a block diagram showing a wireless communication system.

FIG. 1 is a block diagram representing a wireless communication system.

Referring to FIG. 1, a wireless communication system 10 includes at least one base station 11 (BS). Each base station 11 provides communication services for a specific geographic area (generally referred to as a cell) 15*a*, 15*b* and 15*c*. The cell may be divided into a number of areas (called as sectors). The terminal 12 (user equipment, UE) may have fixed or mobile and may be referred to as another terminology such as a mobile station (MS), a user terminal (UT), a subscriber station (SS), a wireless device, a personal digital assistant (PDA), a wireless modem, a handheld device, and so on. The base station 11 is typically a fixed station to communicate with the terminal 12 and may be referred to as another terminology an evolved-NodeB eNB, a base transceiver system (BTS), an access point, and so on.

Hereinafter, a downlink (DL) refers to a communication link from the base station to the terminal, and an uplink (UL) refers to a communication link from the terminal to the base station. In the downlink, a transmitter may be a part of the base station, and a receiver may be a part of the terminal. In the uplink, the transmitter may be a part of the terminal, and the receiver may be a part of the base station.

The wireless communication system can support multiple antennas. In order words, the transmitter may use a number of transmission antennas, the receiver may use a number of receiving antenna. The transmitting antenna means a physical or logical antenna used to transmit a signal or stream, and the receiving antenna means a physical or logical antenna used to receive a signal or stream. If the transmitter and receiver may use a number of antennas, the wireless communication system may be referred to as a multiple input multiple output (MIMO) system.

A variety of transmission techniques can be used in the MIMO system. The transmission technique means a technique in which the base station transmits downlink data to the terminal. The MIMO transmission technique may include transmission diversity, a spatial multiplexing, a beamforming, and so on. The transmission diversity is a technique for transmitting the same data in multiple transmission antennas to improve transmission reliability. The spatial multiplexing is a technique for transmitting different data in multiple transmission antennas simultaneously to transmit high-speed data without increasing bandwidths of the system. The beamforming may be used to increase a signal to interference plus noise ratio (SINR) of a signal by adding weights according to a channel status in the multiple antennas. In this case, the weight may be represented as a weight vector or a weight matrix, which are referred to as a precoding vector or precoding matrix.

The spatial multiplexing may include a spatial multiplexing for single user and a spatial multiplexing for multiple users. The spatial multiplexing for single user is referred to as Single User MIMO (SU-MIMO) and the spatial multiplexing for multiple users is referred to as Spatial Division Multiple Access (SDMA) or Multi User MIMO (MU-MIMO).

The MIMO transmission technique may be semi-statically set by higher layer signaling such as a radio resource control (RRC).

Figure 2:
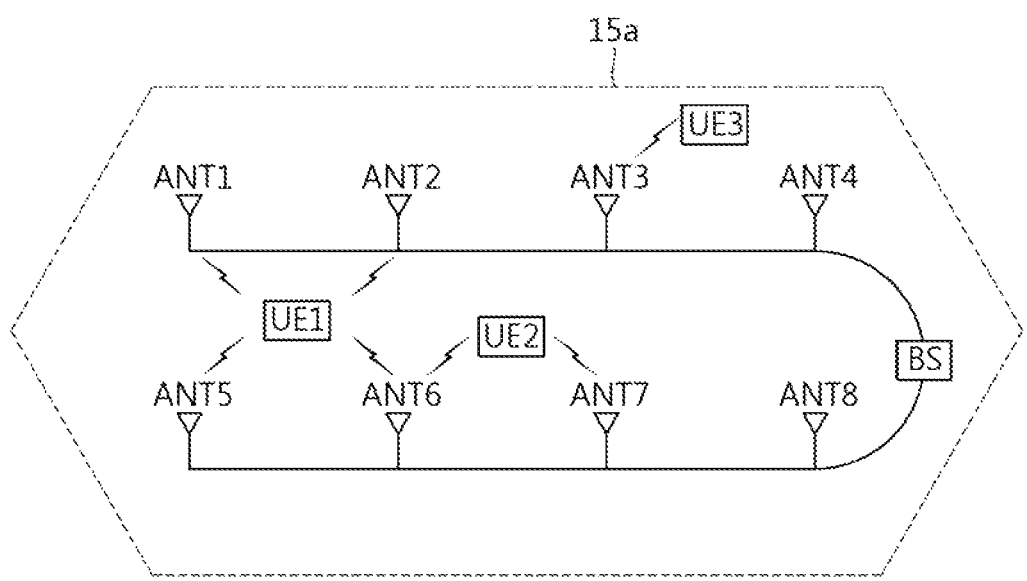
FIG. 2 illustrates a distributed antenna system.

FIG. 2 illustrates a distributed antenna system.

Referring to FIG. 2, a distributed antenna system (DAS) includes a base station (BS) and base station antennas (for example, ANT 1 to ANT 8) (hereinafter, the base station antenna is referred to as an antenna). The antennas (ANT1 to ANT 8) may be connected to the base station (BS) via a wired or wireless. Unlike a conventional centralized antennal system (CAS) antenna, the distributed antenna system may be distributed and disposed in a variety of locations within a cell. That is, the antennas are not centralized in a particular point of a cell 15a, for example, in the middle of the cell. FIG. 2 shows an example in which each antenna is disposed at each spaced points, but multiple antennas may be distributed in the each spaced points in a concentrated form.

In this case, the antennas may be distributed to allow rank 2 or more transmission by overlapping antenna coverage areas. For example, the coverage of the each antenna may be extended to the adjacent antenna. In tins case, in the terminals that exist within the cell, the strength of signal received from a plurality of antennas may be variously changed according to locations, channel status, etc within the cell. Referring to the example of FIG. 2, in the terminal 1 (UE 1), the signals with a good sensitivity may be received from antennas 1, 2, 5 and 6. On the other hand, the effect of the signals transmitted from antennas 3, 4, 7 and 8 may be less effective due to path loss.

In addition, in the terminal 2 (UE 2), the signals with a good sensitivity may be received from antennas 6 and 7, and the effect of the signals transmitted from the rest of antennas may be less effective. Similarly, in the terminal 3 (UE 3), the signals with a good sensitivity may be received from only the antenna 3, and the signals of the rest of antennas may be week enough to be neglected.

In the distributed antenna system, the MIMO communication can be easily performed for the terminals spaced apart from each other within the cell. In the example, the terminal 1 may be to communicate through the antennas 1, 2, 5 and 6, the terminal 2 may be to communicate through the antenna 7, and the terminal 3 may be to communicate through the antenna 3. The antennas 4 and 8 may transmit signals for the terminal 2 or the terminal 3, but may do not transmit any signal. That is, the antennas 4 and 8 may be operated in an off-state, if necessary.

As described above, when the SU-MIMO/MU-MIMO communication is performed in the distributed antenna system, the layer (that is, the number of transport stream) per each terminal may be variously provided. In addition, antennas (or antenna group) allocated to each terminal may be different. In the other words, a particular antenna (or antenna group) for each terminal may be supported by the distributed antenna system. The antennas supported to the terminal may be changed according to the time.

Figure 3:
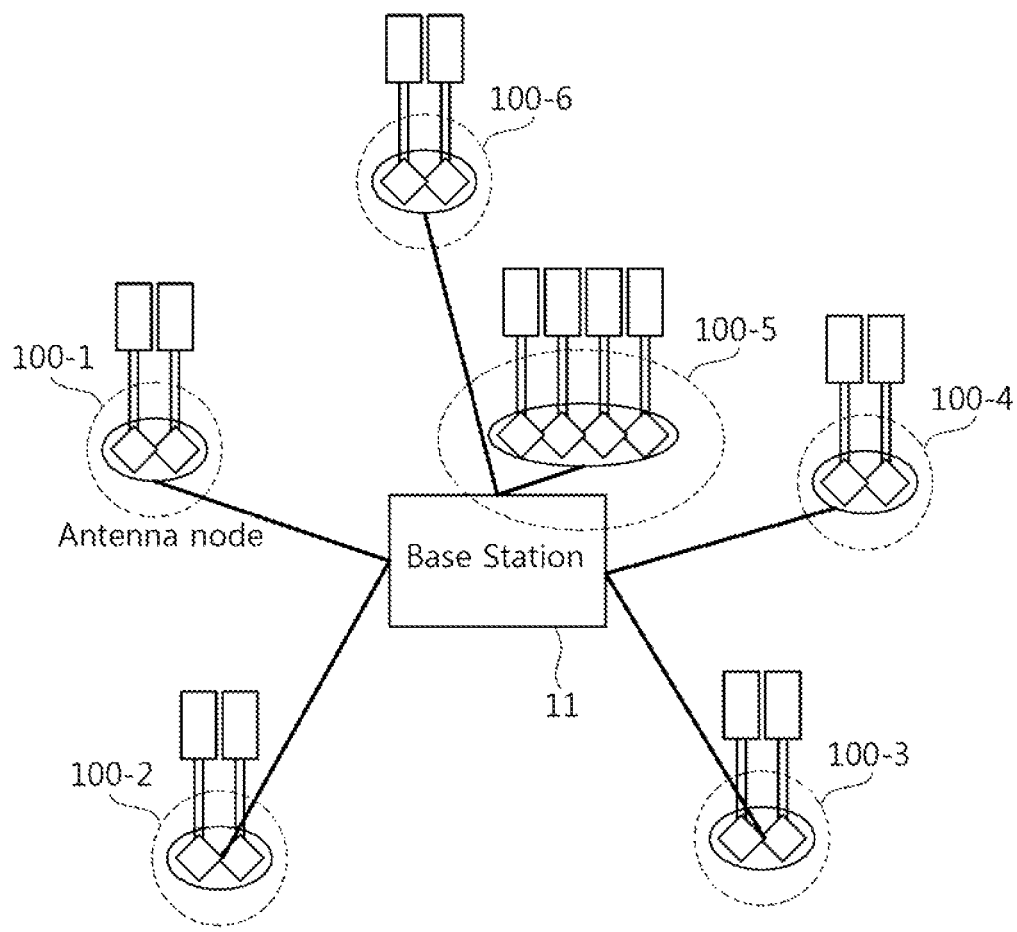
FIG. 3 shows an example of a configuration of a distributed antenna system.

FIG. 3 shows an example of a configuration of a distributed antenna system.

The distributed antenna system may include a base station 11 and a plurality of antenna nodes 100-1 to 100-6) connected to the base station 11. The antenna nodes 100-1 to 100-6 may include only one antenna, or a plurality of antennas, respectively. The antenna nodes 100-1 to 100-6 may be connected to the base station via a wired or wireless. The antennas included in one antenna node may be geographically located within several meters and may be seen as the antennas that belong to the same point at the terminal side. Each antenna node functions as an access point that can be accessed by the terminal.

However, in the conventional distributed antenna system, the antenna and the antenna node are assumed to be the same or do not clearly distinguish. In order to operate the distributed antenna system, the antenna and the antenna node need to be clearly distinguished and thus to exchange information between the base station and the terminal.

According to the present invention, the antenna node means a set of antennas to transmit the same channel measurement signals (for example, midamble, pilot or reference signals), or a set of antennas that can apply channel estimation results using the channel measurement signals. For example, when the midambles mapped to the same time and frequency resources are transmitted from all four antennas, the four antennas constitute one antenna node. Alternatively, even when the midamble is transmitted from only any one of the four antennas and then, the channel estimation results estimated by measuring such a midamble can be applied in the other antennas in common, the four antennas constitute one antenna node. Or, even when the midamble is alternately transmitted from the four antennas using the resources divided in the time domain or frequency domain and then the channel estimation results estimated by measuring such a midamble can be applied in the other antennas, the four antennas can be considered as one antenna node.

Hereinafter, in the distributed antenna system, an information exchange process between the base station and the terminal will be described.

1. Step 1: Cell Entry

When the terminal enters within the cell through a network entry, a re-entry, a scanning, an association, a handover (HO), or the like, the terminal transmits a network entry request signal to the base station.

In the centralized antenna system, when the base station receives the network entry request signal of the terminal, the number of the entire antennas within the cell is broadcasted to the terminal. On the other hand, in the distributed antenna system according to the present invention, the base station can additionally broadcast information on the antenna node in addition to the number of the entire antennas.

Herein, the antenna node information may include the number of the entire antenna nodes within the cell and/or the number of the antennas of each antenna node, and/or index mapping information. The index mapping information may be information representing which antenna is included in the each antenna node. For example, it is assumed that N antenna nodes and M antennas exist within the cell. In this case, any one of antenna nodes (n) may include Mn antennas. Then, antennas corresponding to antenna indexes (m, m+1, ..., m+Mn-1) may be mapped to the antenna nodes (n). The index mapping information may be given in various forms depending on mapping function relationships between the antenna node and the antenna. For example, the index mapping information may be given as the n value and the m value. Since the terminal may know the number of antennas (Mn) of the antenna nodes (n) from the antenna node information, it is known that the antenna index may be mapped to the corresponding antenna node (n) from the antenna (m) to the antenna (m+Mn-1).

Alternatively, the base station may broadcast only the number of the entire antenna nodes in order to reduce the amount of information overhead of the antenna node information. In this case, in step 3 described later, the number of antennas and the index mapping information of the corresponding antenna node may be unicasted to each terminal.

2. Step 2: Uplink Signal Transmission Request of the Base Station and Uplink Signal Transmission of the Terminal The base station may request the uplink signal transmission to the terminal. For example, the base station may request an uplink sounding signal transmission of or a feedback information transmission. When the base station requests the feedback information, the feedback information transmission may include information on the kind of information to be fed back by the terminal and the number of the antenna nodes to be included in the feedback information by the terminal, where the information may included in the transmission request signal of the feedback information. The uplink signal transmission request is for a request of the information required when the antenna node allocation is performed to the terminal. The uplink signal transmission request may be broadcasted to the terminal. Alternatively, if the base station requests other feedback information for each terminal, it may be unicasted to a particular terminal or particular terminal groups. In addition, the uplink signal transmission request may be performed in step 1 as mentioned above. That is, when the base station broadcasts the antenna node information, the base station may also broadcast including the uplink signal transmission request.

Alternatively, the uplink signal transmission request may be omitted. For example, after the terminal enters the network, the feedback information required for the antenna node allocation may be already defined so as to be transmitted to the base station over a specific interval. In this case, the uplink signal transmission request may be unnecessary.

The existing control information may be transmitted in addition to the uplink signal transmission request as described above. For example, the base station may transmit transmission power control information available at the time of the uplink sounding signal transmission with the uplink sounding signal transmission request.

The terminal transmits the corresponding uplink signal in response to the uplink signal request of the base station. For example, the terminal transmits the uplink sounding signal or the feedback information.

If the terminal transmits the feedback information to base station in response to the uplink signal request. After the signal strength is measured using midambles transmitted by the each antenna or antenna node, the terminal can transmit the information by including at least one of the following information:

1. Receiving strength for all antenna nodes of the downlink
2. Receiving strength of the antenna node selected by the terminal, among the all antenna nodes of the downlink.
3. The number of the antenna nodes of the downlink requested by the terminal
4. The number of antenna nodes that satisfy the selection criterion.
5. The index of the antenna node requested by the terminal, among the all antenna nodes of the downlink (for example, may be in the form of a bitmap).
6. The index of the antenna node that satisfies the selection criterion among the all antenna nodes of the downlink (for example, may be in the form of a bitmap)

For example, the selection criterion is to determine whether the receiving strength of the downlink signal transmitted from the antenna node exceeds a threshold value.

If the base station designates the number of antenna nodes to be fed back to the terminal, the terminal can feed back the index of the antenna node with a minimum receiving strength from the index of the antenna node with a maximum receiving strength according to the number of the antenna nodes. In this case, the receiving strength of each antenna node may be also fed back.

The base station obtains at least one or more information of the uplink sounding signal, the feedback information from the terminal, and the strength of the uplink signal, through the uplink signal transmitted by the terminal. The uplink sounding signal may be used in the antenna node allocation for the terminal in a time division duplex (TDD) mode. The feedback information may used in the antenna node allocation in a frequency division duplex (FDD) mode. Of course, the uplink sounding signal or the feedback information is not used in only the TDD or FDD, and they are available regardless of the TDD or FDD.

Figure 4:
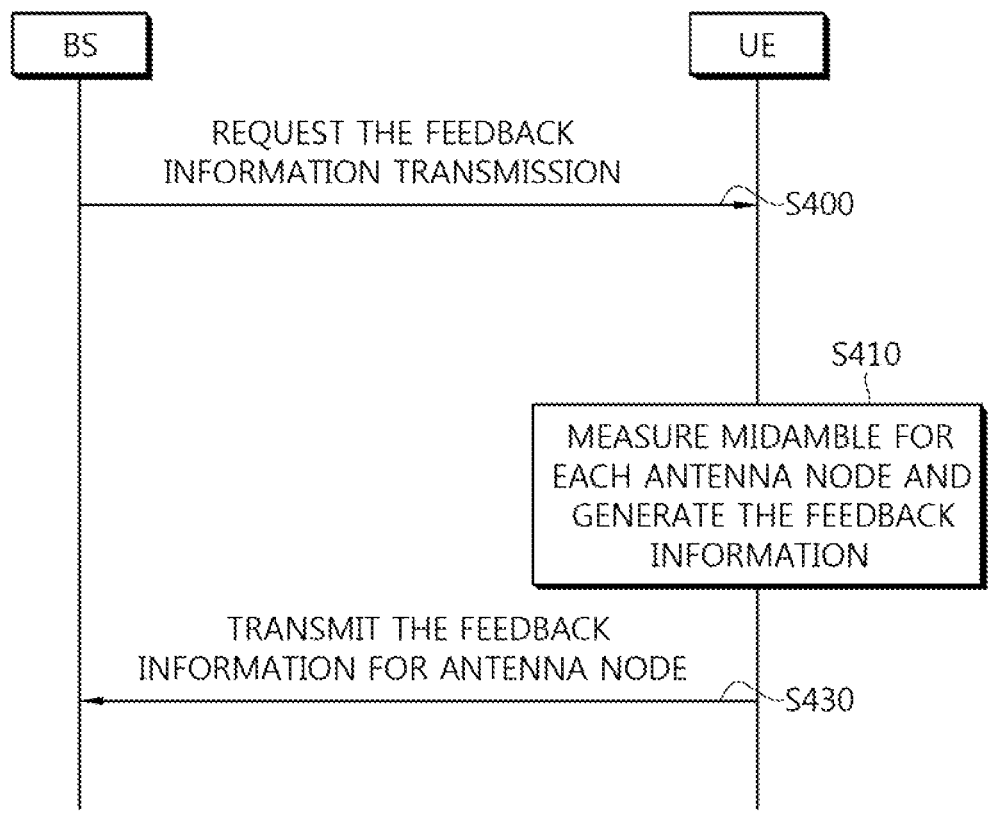
FIG. 4 shows a signaling process between a base station and a terminal in step 2.

FIG. 4 shows a signaling process between a base station and a terminal in step 2.

In other words, FIG. 4 shows a signaling process between the base station and the terminal, if the base station requests the feedback information transmission in step 2. The base station requests the feedback information transmission to the terminal feedback information (S400). As described above, the feedback information transmission may include information on the kind of information to be fed back by the terminal and the number of the antenna nodes to be included in the feedback information. In this time, the base station can transmit one channel measurement signal (for example, midamble or pilot signal) per an antenna node. For example, one midamble pattern is used per an antenna node. Herein, the midamble pattern is a method of determining locations of resource elements allocated by the midamble within the time-frequency resource. The midamble pattern may be determined within a basic unit determined in a prescribed time domain and/or frequency domain and the midamble pattern in the basic unit is repeated in the frequency domain.

The conventional centralized antenna system uses different midamble pattern by each antenna. Therefore, as the number of the antennas is increased, the number of the midamble is also increased. If the distributed antenna system uses different midamble pattern by each antenna, as in the conventional centralized antenna system, as the number of the antennas is increased, the overhead of the midamble will be increased excessively. On the other hand, if the midamble pattern is used in unit of antenna node, as in the present invention, since the number of required midamble patterns may be reduced, the overhead can be reduced. In addition, since more resources may be used in one midamble pattern, the resolution of the midamble can be improved. In addition, in the distributed antenna system, unlike the centralized antenna system, since the antennas are spaced apart and disposed within the cell, the channel status between the antenna and the terminal may be very different according to the location of the terminal within the cell and the channel status. Therefore, as in the present invention, it is more efficient to transmit the channel measurement signal in an antenna node unit (for example, the antenna node unit made up of geographically adjacent antennas).

The terminal measures the midamble for each antenna node to generate the feedback information (S410). Here, the feedback information is not generated for the each antenna, but generated for each antenna node.

The terminal transmits the feedback information for antenna node to the base station (S430). Then, the base station allocates the antenna node to the terminal by referring to the feedback information. Accordingly, the terminal may be allocated in an antenna node, not an antenna unit by base station. This is because the antennas within the antenna node are geographically adjacent. Therefore, since all channel states may be considered to be similar, it is more effective to be allocated in the antenna node unit rather than allocating antennas while increasing signaling overhead.

3. Step 3: Antenna Node Allocation Information (Antenna Allocation Information) Transmission for Each Terminal of the Base Station The base station may generate antenna node allocation information (antenna allocation information) using an uplink signal, for example, feedback information, received from the terminal antenna node allocation information (antenna allocation information) and then unicast the information to each terminal. The antenna node allocation information may include information on any antenna node that can be used in the downlink and/or the uplink, information on the number of antennas that may be included in the used antenna node, information on the midamble pattern that may be used for each antenna and the like.

Specifically, the antenna node allocation information to be transmitted to each terminal by the base station may include some or all of the following information.

1. The number of antenna nodes
2. Antenna node indexes
3. Pattern indexes of channel measurement signals (for example, a midamble or pilot) allocated in an antenna node unit
4. The number of antennas of each antenna node
5. Antenna indexes
6. Pattern indexes of channel measurement signals (for example, a midamble or pilot) allocated in an antenna unit
7. Pattern information of channel measurement signals allocated in an antenna unit (for example, information on time and/or frequency resources, sequence, etc.)
8. Mapping information between the antenna node index and the antenna index
9. Mapping information between the pattern index of the channel measurement signal allocated in an antenna node unit and the pattern index of the channel measurement signal allocated in an antenna unit In the above-mentioned antenna node allocation information, the antenna nodes index or antenna index may include indexes for an antenna node and antenna transmitting or receiving signals to the terminal. In addition, the antenna nodes index or antenna index may include index information on the antenna nodes or antenna that can be operated as interference, through it does not transmit a signal to the terminal as a destination station. In this regard, it will be described in more detail in 'A terminal transmits the feedback information to the base station in the distributed antenna system according to another embodiment of the present invention' described later. In addition, it may include index information on an antenna node or antenna allocated to other terminal (for example, other terminal grouped into a pairing to multiplex).

The antenna node index or antenna index may be transmitted in the form of a bitmap, and in the form of knowing that any antenna node index can be excluded from antenna node indexes included in the feedback information transmitted by the terminal.

The mapping information included in the antenna node allocation information may be information on all antenna nodes within a cell. However, it may be more efficient to configure information limited to an antenna node allocated by the terminal. For example, in '8. Mapping information between the antenna node index and the antenna index', the mapping information can be transmitted for all antenna nodes and antennas within a cell. However, it may be more efficient to transmit the mapping information between the antenna nod and the antenna by limiting to a particular antenna node allocated by the terminal.

As mentioned above, the antenna node allocation information may include some or all of the information 1 to 9, and can be determined according to whether the antenna node information broadcasted by the base station in step 1 includes any information.

For example, if the number of antennas of each antenna node and index mapping information may be included in the antenna node information broadcasted in step 1, even if only the number of antenna nodes (1) and the antenna node indexes (2) in step 3 may be transmitted, the terminal can recognize that any antenna is used in the transmission.

In addition, even if the base station does not broadcast the antenna node information in step 1, the antenna node allocation information should be transmitted by including an allocated antenna node and all information on an antenna included in the allocated antenna node. That is, it can transmit all information by including the above information (1 to 9).

In addition, the base station can directly transmit the antenna information. In this case, only the number of antennas allocated to the terminal, the antenna index, the pattern index of the channel measurement signal for example, a midamble or pilot) allocated in the antenna unit, and the pattern information of the channel measurement signal allocated in an antenna unit (for example, information on time and/or frequency resources, sequence information, etc.) can be transmitted. In this case, the terminal can recognize to communicate with only any antenna, not any antenna node. Accordingly, the terminal has a disadvantage that does not actively request the change of antenna nodes. However, the terminal has an advantage of reducing the signaling overhead.

As stated above, the antenna node allocation allocates one antenna node to one terminal by the antenna node allocation information, but it is not limited to thereof. In other words, a plurality of terminals can be supported in the same antenna node through a variety of methods such as the FDMA (frequency division multiple access), the CDMA (code division multiple access), the TDMA (time division multiple access), the SDMA (spatial division multiple access) and the like.

The base station can allocate a particular antenna node to the terminal through the antenna node allocation information and provide information on the channel measurement signal (for example, a midamble or pilot) that used in a separate antenna of the particular antenna node.

FIGS. 5 to 8 show an example of a midamble that can be used in a separate antenna in a particular antenna node.

Figure 5:
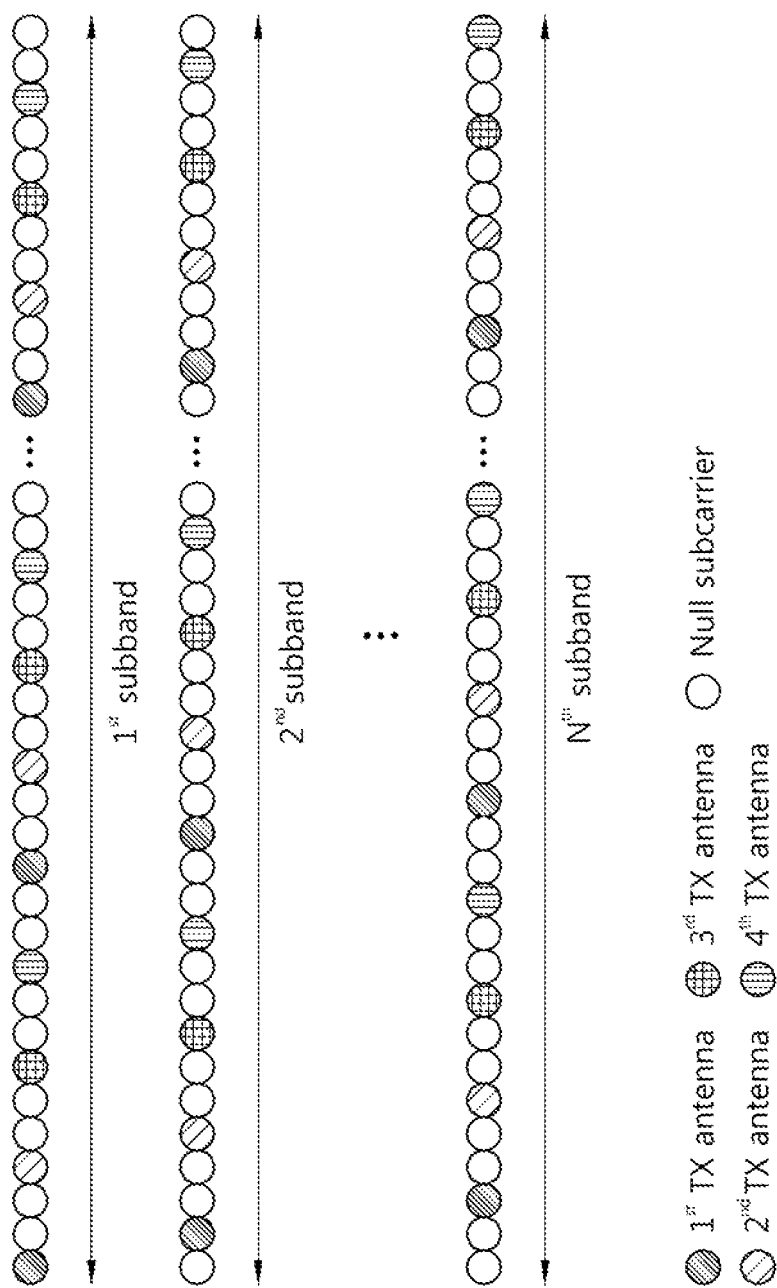
FIGS. 5 to 8 show an example of a midamble that can be used in a separate antenna in a particular antenna node.

FIG. 5 shows an example of the midamble pattern that may be used when four antennas are included in a particular antenna node. This is identical with a midamble pattern defined in the IEEE 802. 16m. Referring to FIG. 5, the midamble pattern for one antenna is mapped to a location of a subcarrier separated by the same interval from a particular OFDMA symbol within one frame. The four midamble patterns are transmitted from the same OFDMA symbol in the form to be placed so that they are not overlapped in the frequency domain. That is, the base station may transmit the four midamble patterns that use different frequency resources from the same OFDMA symbol.

Figure 6:
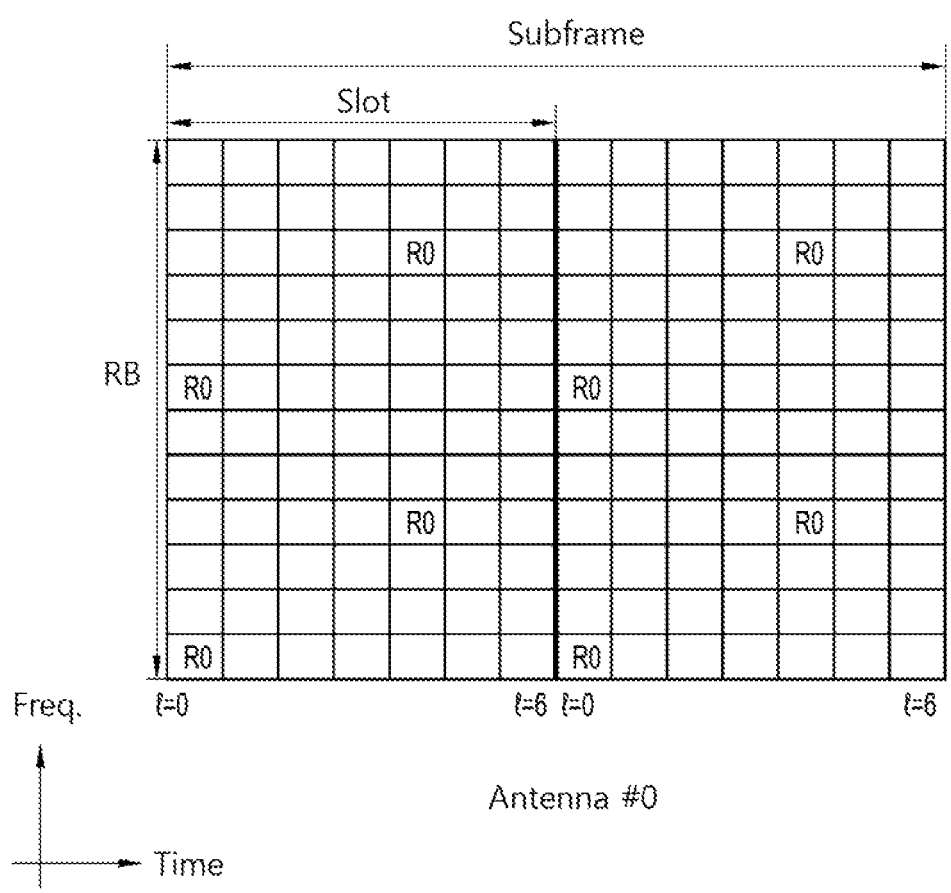
Figure 7:
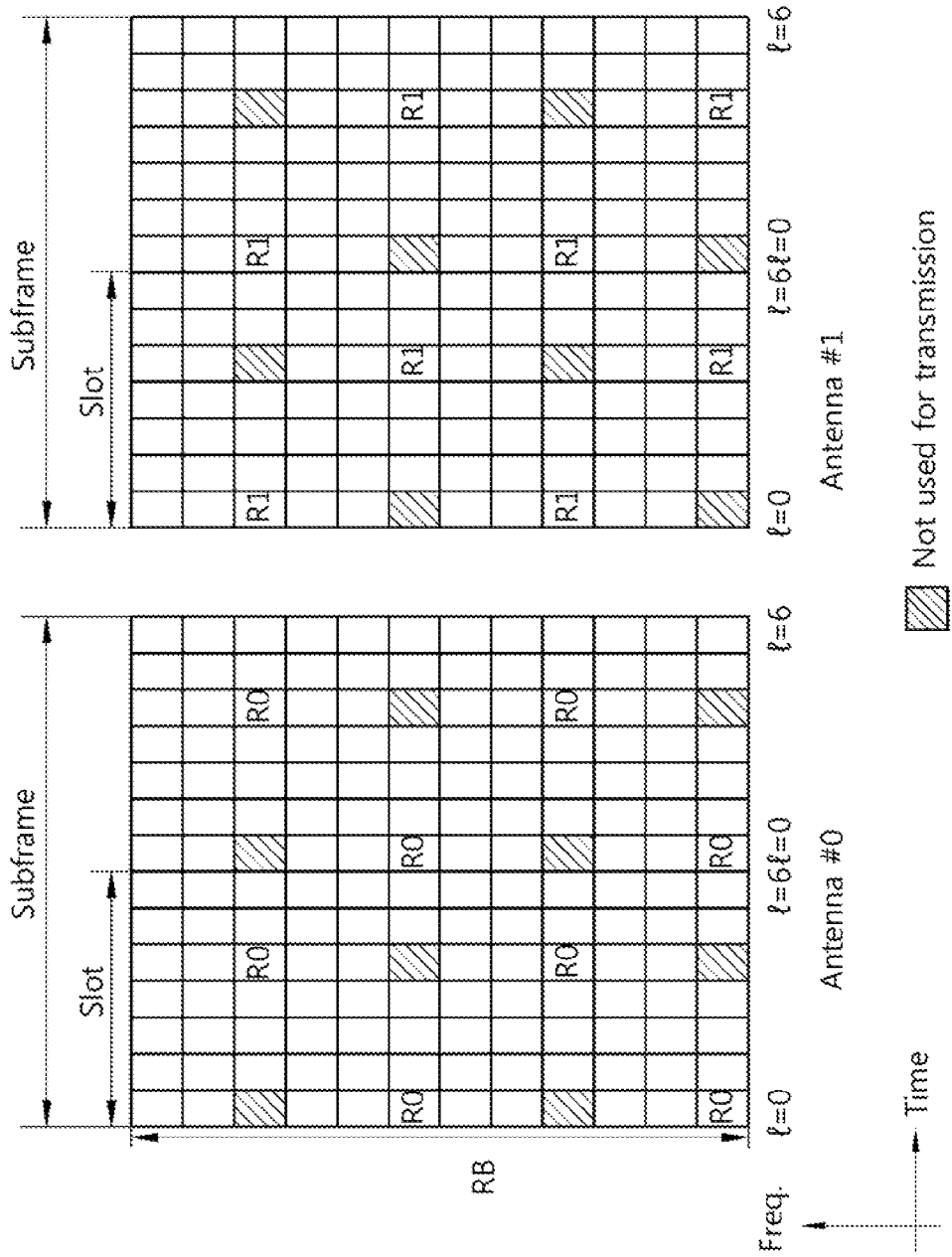
Figure 8:
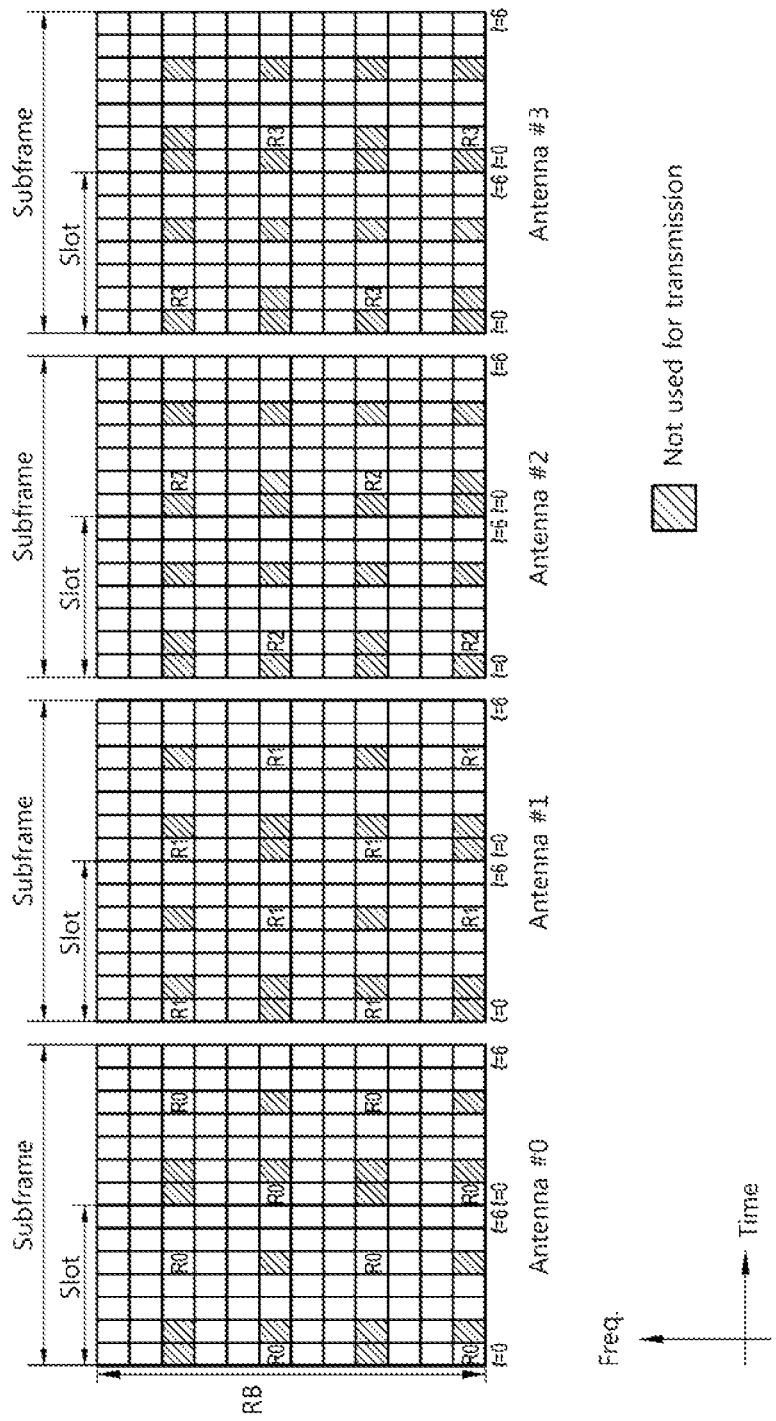

FIG. 6 shows an example of a midamble (common reference signal) pattern for one antenna in the case of a normal CP. FIG. 7 shows an example of a midamble (common reference signal) pattern for two antennas in the case of the normal CP. FIG. 8 shows an example of a midamble (common reference signal) pattern for four antennas in the case of the normal CP.

Referring to FIGS. 6 to 8, Rp represents resource elements used in a midamble transmission through an antenna #p (p=0, 1, 2, 3). The resource elements used in a midamble transmission are called as midamble resource elements. Rp represents midamble resource elements for the antenna #p. Rp is not used for any transmission through all other antennas except for the antenna #p. In other words, resource elements used for the midamble transmission through any antenna within a subframe is not used for any transmission through other antennas within the same subframe and may be set to zero. This is to avoid interference between antennas.

As shown in FIGS. 5 to 8, patterns of the channel measurement signals for each antenna may have an index, separately, and '6. Pattern index of the channel measurement signal (for example, a midamble or pilot) allocated in an antenna unit', '7. Pattern information of the channel measurement signal allocated in an antenna unit (for example, information on time and/or frequency resources, sequence, etc.)' and '9. Mapping information between the pattern index of the channel measurement signal allocated in an antenna node unit and the pattern index of the channel measurement signal allocated in an antenna unit' and the like, which are included in the antenna node allocation information, may be directed to the terminal.

After the antenna node is allocated for each terminal, the base station can transmit different midamble pattern for each antenna within the antenna node to be used for channel estimation on each antenna.

4. Step 4: Data Transmission and Receiving Step

When the antenna node allocation is completed by the base station, the terminal may receive data transmitted from the allocated antenna node. The base station may receive uplink data transmitted by the terminal from the allocated antenna node.

The above-mentioned steps 1 to 4 may be all performed, and only a portion thereof may be repeatedly performed according to the position of the terminal. For example, when the terminal firstly enters the cell, steps 1 to 4 may be all performed sequentially. On the other hand, after the terminal enters the cell, step 2 may be performed after step 4 or in the course of performing step 4. The general feedback information transmission such as a channel quality indicator (CQI), a precoding matrix index (PMI) and the like required in the process of the transmission and reception between the base station and the terminal may be performed together with the uplink transmission for the antenna node allocation of the step 2. In addition, the base station may perform together with the uplink signal transmission request of the step 2 when transmitting the downlink control information for the terminal 에 대한 downlink control information.

In addition, step 3 may be not performed after the above-mentioned step 2. That is, even if the terminal may transmit the uplink signal for the antenna node allocation in step 2, the base station may not perform the antenna node allocation of the step 3. The base station can intermittently perform the antenna node allocation by considering the speed, a change in position, and the like. If the base station changes the antenna node allocation information and then transmits the changed information, the terminal may transmit and receive data to and from the antenna node according to the changed antenna node allocation information. If step 2 is performed together with step 4, the following steps may be performed in the terminal Step 1->Step 2->Step 3->Step 4(Step 2)->Step 3->Step 4(Step 2)->Step 3->Step 4(Step 2), . . . . The parenthesis represents the meaning that can be performed at the same time.

Figure 9:
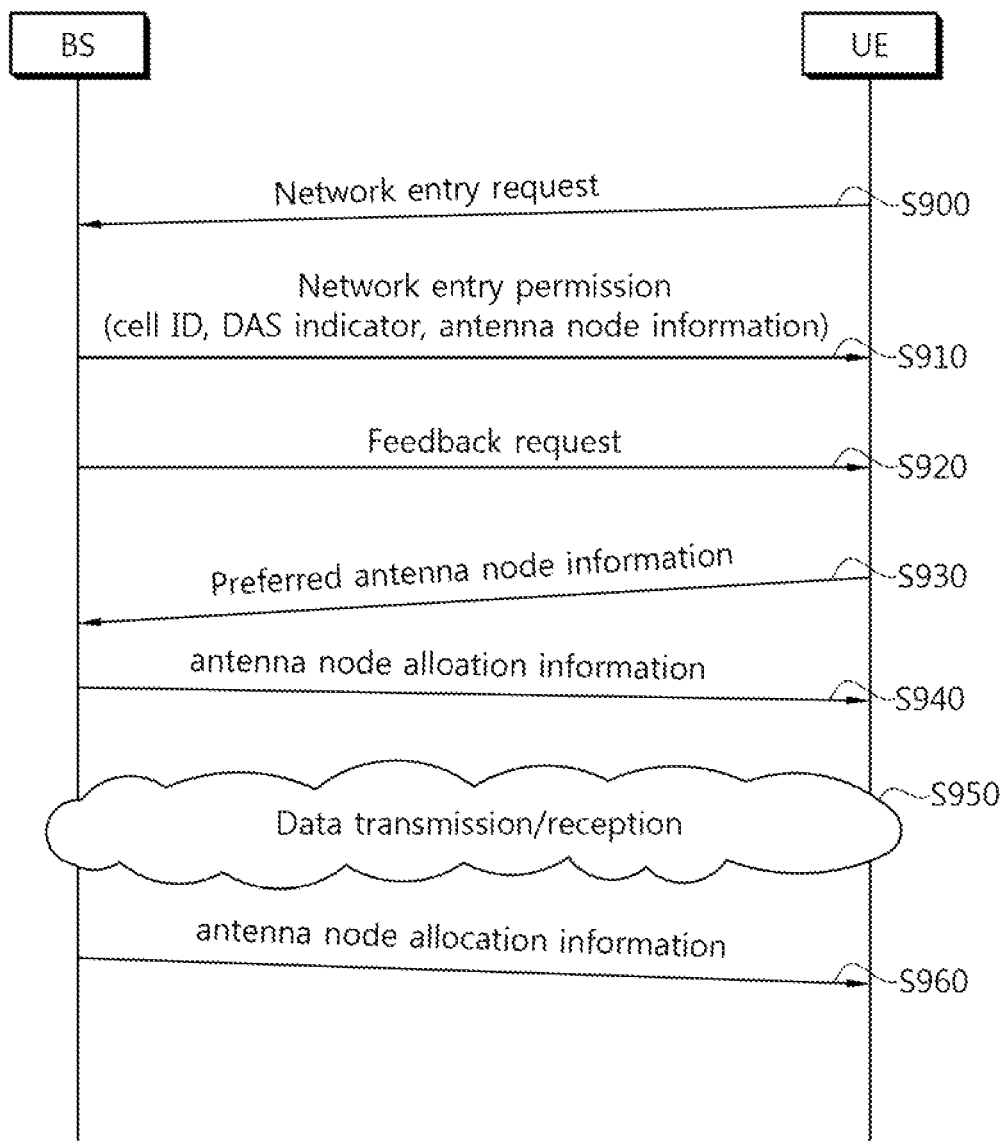
FIG. 9 shows an example of a signaling process between a base station and a terminal in steps 1 to 4.

FIG. 9 shows an example of a signaling process between a base station and a terminal in steps 1 to 4 as described above.

If the terminal enters within a cell, the terminal transmits a network entry request signal to the base station (S900). If the base station receives the network entry request signal, the base station permits the network entry (S910). When the network entry is permitted, the base station may inform the terminal of cell identification (ID), a DAS indicator indicating the distributed antenna system, and antenna node information. This process is described in detail in the above-mentioned step 1.

In addition, at the process (S910), the base station requests feedback information transmission for antenna node allocation to the terminal (S920). The terminal transmits the results measured from indexes of preferred antenna nodes and the selected antenna nodes at the time of downlink transmission based on the antenna node information (S930). For example, the signal measurement results may be a signal to noise plus interference ratio (SINR) for the signal of the selected antenna node. The processes of steps S920 and S930 are described in detail in the above-mentioned step 2.

The base station generates antenna node allocation information based on feedback information transmitted by the terminal and transmitted the generated information to the terminal (S940). The antenna node allocation information may include a variety of information for the antenna node allocated to the terminal as described above. This process is described in detail in the above-mentioned step 3.

When the antenna node allocation is completed, data transmission and reception is performed between the base station and the terminal (S950). In the process of data transmission and reception, the terminal can periodically transmit the feedback information, which is information on a preferred antenna node (that is, step 2 is performed together with step 4). The base station can change the antenna node allocation for the terminal and transmit the changed antenna node allocation information to the terminal when predetermined specific periods or particular conditions are satisfied (S960). After that, data transmission and reception may be performed using the antenna node according to the antenna node allocation information again changed between the base station and the terminal again.

According to another embodiment of the present invention, the base station can broadcast the number of antenna nodes through a super frame header (SFH), additional broadcast information (ABI), a downlink channel descriptor (DCD), or a broadcast channel (BCH). The terminal can feedback information on a preferred antenna node after measuring a strength of downlink signal using channel measurement signals(for example, midambles) set in an antenna node unit. The base station can inform the terminal of the number of antennas included in the antenna node allocated to the terminal and/or information on channel measurement signals (for example, midamble) applied to the antennas using the feedback information transmitted by the terminal.

The entire number of patterns of the midambles that can be applied to the antenna unit may be greater than the number of antennas actually allocated to the terminal. In this case, the base station can inform the entire number of patterns of the midambles that can be applied to the antenna unit, the number of patterns of the antenna unit midambles for antennas allocated to the terminal and/or indexes of the antenna unit midamble patterns The terminal measures the channel of the allocated antenna using the midambles (midambles of antenna units, not antenna nodes) corresponding to the number of allocated antennas.

Hereinafter, in a distributed antenna system according to other embodiment of the present invention, the feedback information to be transmitted to the base station by the terminal will be described.

In the conventional distributed antenna system, the base station transmits channel measurement signals such as midambles to the terminal, and the terminal feeds back a channel measurement signal to the base station by measuring the channel measurement signals and selecting an antenna or an antenna node that is in good condition according to the criteria such as the receiving strength. That is, the terminal may transmit information on a preferred antenna or antenna node to the base station.

However, in the distributed antenna system, an antenna may be installed with high density within a cell in order to achieve high data transmission rate. In this case, the terminal may receive signals with a high receiving strength from most of the antennas or antenna nods. In other words, as a result of the channel measurement of the terminal, most of antennas may be the preferred antennas or antenna nodes in the system. Then, the amount of information fed back to the base station by the terminal is increased.

Therefore, according to the present invention, 1) the terminal feeds back information on a non-preferred antenna or antenna node, not information on a preferred antenna or antenna node, to the base station. For example, the terminal may be fed back information on an antenna or antenna node, in which the information includes a receiving strength such as a SINR lower than a certain threshold value by measuring a midamble. According to this method, the amount of the feedback information of the terminal can be reduced.

In addition, 2) the terminal may feed back information on a non-preferred antenna or antenna node, in addition to information on a preferred antenna or antenna node, to the base station. For example, it is assumed that the distributed antenna system supports only one antenna node for each terminal. In this case, in the conventional method, the terminal feeds back information on one preferred antenna node (for example, an antenna node with the highest receiving strength) to the base station by measuring the midamble.

However, the terminal may receive signals with a relatively high receiving strength or a relatively low receiving strength from other antenna nodes other than the above-mentioned preferred antenna node. For example, in a terminal A, an antenna node 1 may be a preferred antenna node, signals with a relatively high receiving strength may be received from an antenna node 2, and signals with a relatively low receiving strength may be received from an antenna node 3. In this case, if the base station transmits signals on the other terminal from the antenna node 2, the signals may affect the terminal A as a strong interference. On the other hand, if the base station transmits signals on the other terminal from the antenna node 3, the interference may not strongly affect the terminal A. Accordingly, the terminal A may feed back information on a non-preferred antenna node 3, in addition to information on a preferred antenna node 1, to the base station. Through the feedback information, the base station can recognize that the antenna node 1 is in the best channel condition and the antenna node 3 does not act as the interference. The base station can predict whether signals can transmitted through any antenna node for the most reduced interference using the feedback information transmitted by each terminal.

The distributed antenna system can selectively apply the above-mentioned method 1) or 2) according to an antenna installation method of a cell. That is, the method 1) may be used in a cell in which antennas are installed within the cell with a high-density so that the terminal is in a good channel condition with the most of antennas, and the method 2) may be used in other cell. If the terminal is moved between cells, there may be a problem whether any method of the above-mentioned two methods is used in a particular cell.

To solve this problem, the following methods 1) and 2) are provided. 1) The base station can broadcast by including parameters indicating the feedback method of the terminal to the system information. The system information can be transmitted through a BCH (broadcast channel), an A-MAP and the like, for example. 2) A feedback method of the terminal applied by each base station is already defined, and the terminal recognizes ID of the base station such that the feedback method may be known. That is, this is a method that can be automatically recognized whether any feedback method is applied when the terminal recognizes the ID of the base station by classifying the ID of the base station applied by the above-mentioned methods 1) and 2). 3. There is a method of transmitting information in which feedback mode information that indicates the feedback method may be included in the control information unicasted to the each terminal by the base station. For example, it may be transmitted by including information that indicates the feedback mode of the terminal such as a MFM (MIMO feedback mode) in a feedback allocation A-MAP IE (Advanced-MAP Information Element). The feedback mode of the terminal may be classified as shown in the following table.

| Feedback Mode | Feedback Information of Terminal |
| --- | --- |
| 1 | One preferred antenna nodes index |
| 2 | Non-preferred antenna nodes indexes |
| 3 | One preferred antenna nodes index and Non-preferred antenna nodes indexes |

The terminal may be known whether any information included in the feedback information is transmitted, through any one of the above-mentioned three ways.

Figure 10:
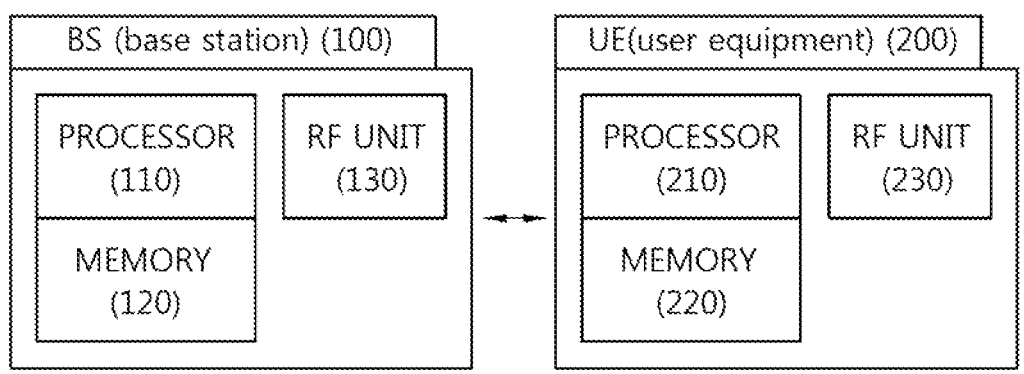
FIG. 10 is a block diagram showing a base station and a terminal.

FIG. 10 is a block diagram showing a base station and a terminal.

The base station 100 includes a processor 110, a memory 120 and a radio frequency (RF) unit 130. The processor 110 may implement the proposed function, the process and/or the method. In other words, the antenna node information is broadcasted to the terminal and is transmitted to the terminal after generating the antenna node allocation information on the basis of the feedback information transmitted by the terminal. The memory 120 is connected to the processor 110 to store a variety of information for driving the processor 110. The RF unit 130 is connected to the processor 110 to transmit and/or receive a radio signal.

The terminal 200 includes a processor 210, a memory 220 and a RF unit 230. The processor 210 receives the antenna node information from the base station and the feedback information transmission request. In addition, the processor 210 may receive the channel measurement signal as an antenna node unit, calculate the SINR, determine a preferred antenna node and transmit it to the base station. In addition, the processor 210 may receive the antenna node allocation information from the base station and perform the transmission and reception of data to and from the base station through the corresponding antenna node. The memory 220 is connected to the processor 210 to store a variety of information for driving the processer 210. The RF unit 230 is connected to the processer 210 to transmit and/or receive radio signals.

The processers 110 and 210 may include an application-specific integrated circuit (ASIC), other chipsets, a logic circuit, a data processing unit and/or a converter to mutually convert between a baseband signal and a radio signal. The memories 120 and 220 may include a read-only memory (ROM), a random access memory (RAM), a flash memory, a memory card, a storage media, and/or other storage device. The RF units 130 and 230 may include one more antennas to transmit and/or receive radio signals. When the embodiments are implemented in software, the above-mentioned techniques can be implemented as a module (process, function, etc.) to perform the functions described above. The module may be stored in the memories 120 and 220 and performed by the processers 110 and 210. The memories 120 and 220 may be internal or external to the processers 110 and 210 and connected to the processers 110 and 210 as well-known a variety of means.

The present invention may be implemented by a hardware, a software, or a combination of thereof. In the hardware implementation, in order to perform the aforementioned functions, the present invention may be implemented by an application specific integrated circuit (ASIC), a digital signal processing (DSP), a programmable logic device (PLD), a field programmable gate array (FPGA), a processor, a controller, a microprocessor, other electronic units, or a combination of thereof. In the software implement, it is possible to be implemented as a module to perform the functions described above. The software may be stored in a memory unit, and run by the processor. The memory unit or the processer can be adopted as variety of means well known to those skilled in the art.

Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

The invention claimed is:

1. A data transmission and receiving method of a terminal in a distributed antenna system, comprising the steps of:
   receiving information on antenna nodes within a cell from a base station;
   receiving channel measurement signals determined by each antenna node from the base station;
   determining a preferred antenna node by measuring the channel measurement signals;
   transmitting feedback information on the determined antenna node to the base station;
   receiving antenna allocation information determined on the basis of the feedback information; and
   receiving data from the base station through an antenna indicated by the antenna allocation information,
   wherein the antenna node includes at least one antenna.

2. The method according to claim 1, wherein if the antenna node includes a plurality of antennas, the plurality of antennas transmits the same channel measurement signals.

3. The method according to claim 1, wherein if the antenna node includes a plurality of antennas, some antennas of the plurality of antennas transmit the same channel measurement signals.

4. The method according to claim 1, wherein the information on the antenna nodes includes at least one of the number of a total of antenna nodes, the number of the antennas of each antenna node, and index mapping information, the index mapping information being indicated which antenna is included in each antenna node.

5. The method according to claim 4, wherein the information on the antenna node is broadcasted by the base station.

6. The method according to claim 1, wherein the feedback information includes at least one of an index of a transmission antenna node requested by the terminal between all transmission antenna nodes performing a downlink transmission of the base station, a receiving strength of the antenna node selected by the terminal, the number of the transmission antenna node by requested by the terminal, the number of the transmission antenna node to satisfy a selection criterion, and an index of the transmission antenna node that satisfies the selection criterion.

7. The method according to claim 6, wherein the selection criterion is determined according to whether the receiving strength of the downlink signal transmitted from the antenna node exceeds a threshold value.

8. The method according to claim 6, wherein the feedback information further includes a receiving strength of the downlink for each of every transmission antenna nodes.

9. The method according to claim 1, wherein the feedback information includes information on an antenna or antenna node that does not satisfy the selection criterion, the antenna or antenna node that does not satisfy the selection criterion is represented that the receiving strength of the downlink signal transmitted from the transmission antenna node is equal to or less than the threshold value.

10. The method according to claim 1, wherein the antenna allocation information includes at least one of the indexes of antenna allocated to the terminal and the number of the antennas.

11. The method according to claim 1, wherein the antenna allocation information further includes information on the channel measurement signal that is applied to the individual antenna of the antenna node allocated to the terminal.

12. The method according to claim 1, wherein the antenna allocation information includes the index of antenna node allocated to the terminal and the number of the antennas included in the antenna node allocated to the terminal.

13. The method according to claim 1, wherein the antenna allocation information includes at least one of the number of the antenna nodes, an antenna node index, a pattern index of the channel measurement signal of an antenna node unit, the number of antennas of each antenna node, an antenna index, a pattern index of the channel measurement signal of the antenna unit, mapping information between the antenna node index and the antenna index, and mapping information between the pattern index of the channel measurement signal of the antenna node unit and the pattern index of the channel measurement signal of the antenna unit.

14. The method according to claim 1, wherein the antenna allocation information is unicasted to the terminal.

15. A terminal comprising:
a RF unit transmitting and receiving radio signals; and
a processer connected to the RF unit,
wherein the processer receives information on antenna nodes within a cell from a base station, receives a channel measurement signals determined by each antenna node from the base station, measures the channel measurement signal to determine a preferred antenna node, and transmits feedback information for the determined antenna node to the base station, receives antenna allocation information determined on the basis of the feedback information, and receives data from the base station through an antenna indicated by the antenna allocation information,
wherein the antenna node includes at least one antenna.

16. The terminal according to claim 15, wherein
if the antenna node includes a plurality of antennas, all or some of the plurality of antennas transmit the same channel measurement signals.

* * * * *